(12) United States Patent
Zhao et al.

(10) Patent No.: US 9,110,207 B2
(45) Date of Patent: Aug. 18, 2015

(54) OPTICAL DIFFUSING FILM AND A LIQUID CRYSTAL DISPLAY BACKLIGHT USING THE SAME

(75) Inventors: Baoliang Zhao, Baoding (CN); Yuhang Li, Baoding (CN); Xuliang Wang, Baoding (CN); Xinli Huo, Baoding (CN)

(73) Assignees: CHINA LUCKY FILM GROUP CORPORATION BAODING LUCKY FILM CO., LTD., Baoding (CN); HEFEI LUCKY SCIENCE & TECHNOLOGY INDUSTRY COMPANY LTD., Hefei (CN)

( * ) Notice: Subject to any disclaimer, the term of this patent is extended or adjusted under 35 U.S.C. 154(b) by 83 days.

(21) Appl. No.: 13/990,637

(22) PCT Filed: Nov. 10, 2011

(86) PCT No.: PCT/CN2011/082025
§ 371 (c)(1),
(2), (4) Date: May 30, 2013

(87) PCT Pub. No.: WO2012/071974
PCT Pub. Date: Jun. 7, 2012

(65) Prior Publication Data
US 2013/0242605 A1    Sep. 19, 2013

(30) Foreign Application Priority Data
Dec. 3, 2010 (CN) .......................... 2010 1 0572701

(51) Int. Cl.
*F21V 8/00* (2006.01)
*G02B 5/02* (2006.01)
*G02F 1/1335* (2006.01)

(52) U.S. Cl.
CPC ............ *G02B 6/0043* (2013.01); *G02B 5/0226* (2013.01); *G02B 5/0294* (2013.01); *G02F 1/133606* (2013.01)

(58) Field of Classification Search
CPC .... G02B 5/0226; G02B 5/021; G02B 6/0051; G02F 1/133606
USPC ...................... 362/330, 610; 349/64; 359/599
See application file for complete search history.

(56) References Cited

U.S. PATENT DOCUMENTS 6,741,303 B1 * 5/2004 Okabe ............................ 349/65
7,379,246 B2 5/2008 Kim et al.
(Continued)

FOREIGN PATENT DOCUMENTS

| CN | 1928592 A | 3/2007 |
|---|---|---|
| CN | 101118292 A | 2/2008 |

(Continued)

OTHER PUBLICATIONS

PCT/CN2011/082025 International Search Report (ISR) dated Dec. 15, 2011.

*Primary Examiner* — Peggy Neils
(74) *Attorney, Agent, or Firm* — Matthew J. Lattig; Charter IP, LLC

(57) ABSTRACT

An optical diffusing film and a LCD backlight using the same are provided. The optical diffusing film comprises a transparent substrate made of an optically transparent material with a refractive index of 1.4 to 1.8, and a diffusing coating with a refractive index of 1.4 to 1.7 disposed on an upper surface of the transparent substrate, wherein diffusing particles with a refractive index of 1.4 to 1.7 are distributed in the diffusing coating, and the diffusing particles are in close contact with each other, the diffusing coating has a thickness of ½ to ⅔ of the largest particle size of the diffusing particles, and the coating density of the diffusing particles is $10^3$ to $10^6$ particles per square millimeter.

9 Claims, 3 Drawing Sheets

(56) References Cited

U.S. PATENT DOCUMENTS

2007/0253064 A1* 11/2007 Ookubo et al. ............... 359/599
2009/0128917 A1* 5/2009 Yoshinari et al. ............. 359/601
2010/0073611 A1* 3/2010 Tochigi et al. ................. 349/96

FOREIGN PATENT DOCUMENTS

| | | |
|---|---|---|
| CN | 201218846 Y | 4/2009 |
| CN | 102081177 A | 6/2011 |
| JP | 2008250129 A | 10/2008 |
| JP | 2009116336 A | 5/2009 |

* cited by examiner

OPTICAL DIFFUSING FILM AND A LIQUID CRYSTAL DISPLAY BACKLIGHT USING THE SAME

CROSS-REFERENCE TO RELATED APPLICATIONS

The present application claims priority under 35 U.S.C. §365(a) to PCT International Application No. PCT/CN2011/082025 to the inventors, filed Nov. 10, 2011, which in turn claims priority under 35 U.S.C. §119(a) to Chinese Patent Application No. 201010572701.4 to the inventors, filed Dec. 3, 2010. The entire contents of each of these applications are hereby incorporated by reference herein.

TECHNICAL FIELD

The present invention relates to the field of display technology, and more particularly, to an optical diffusing film and a liquid crystal display (LCD) backlight using the same.

BACKGROUND ART

The existing optical diffusing film is widely used in an apparatus requiring light source, such as a LCD backlight, an advertising lightbox, a lighting lamp, keys of mobile communication devices, etc., to provide uniform illumination. In recent years, there has been a strong demand for higher performance of the optical diffusing film used in LCD, due to the rapid development of LCD backlight and its wide uses in displays of mobile communication devices, displays of notebook computers, desktop monitors, and large-sized LCD TVs. In particular, the demand is mainly focused on enhancing of luminance and uniformity of illumination.

Usually, the existing optical diffusing films applied to LCD backlight are either organic thin films produced by a stretching technique or a multilayer film produced by a coating method, wherein the coating layer of the multilayer film produced by the coating method contains scattering particles in different particle sizes. FIG. 1 shows the configuration of an optical diffusing film prepared by a conventional coating method, which mainly comprises a transparent substrate 10, a diffusing coating 20, scattering particles 40, an antiblocking coating 30 and antiblocking particles 50. The scattering particles 40 having different particle sizes are randomly distributed in the coating of the optical diffusing film produced by the conventional coating method. Incident light which incidents into the coating is sufficiently diffused mainly by the randomly distributed scattering particles 40, such that the direction of the emergent light can be randomly distributed, thereby the defect of the uneven field of the incident light is diminished and flaws of elements of the backlight module underlying the optical film are shielded. Meanwhile, some scattering particles 40 which have larger particle sizes protrude from the surface of the diffusing coating 20, and therefore a curved surface 21 exhibiting certain light-converging ability is formed; accordingly, this optical diffusing film exhibits light-converging ability to some extent. However, it is found that in the configuration of the afore-said film, not only the amount of the scattering particles 40 protruding from the diffusing coating 20 is few, but also the ratio between the thickness of the diffusing coating 20 and the largest particle size of the scattering particles 40 is greater, and the coating density of the scattering particle 40 is smaller. Thus, there is a problem in the afore-said film that, the light-converging ability and the shielding ability is limited.

SUMMARY OF THE INVENTION

The present invention is carried out in view of the above-mentioned defects in the art, and the objects thereof are to provide an optical diffusing film with stronger light-converging ability, enhanced haze and luminance, and to provide a LCD backlight using the same.

To accomplish the above objects, the present invention provides an optical diffusing film comprising a transparent substrate made of an optically transparent material with a refractive index of 1.4 to 1.8, and a diffusing coating with a refractive index of 1.4 to 1.7 disposed on an upper surface of the transparent substrate, wherein diffusing particles with a refractive index of 1.4 to 1.7 are distributed in the diffusing coating; the diffusing particles are in close contact with each other, and the diffusing particles consist of following spherical particles with respective diameters in respective mass percentages: spherical particles with a diameter of 1 to 10 μm in 10 to 30% by mass, spherical particles with a diameter of 11 to 20 μm in 50 to 80% by mass, and spherical particles with a diameter of 21 to 35 μm in 0 to 20% by mass; the diffusing particles are arranged randomly; the diffusing coating has a thickness of ½ to ⅔ of the largest particle size of the diffusing particles; and a coating density of the diffusing particles is $10^3$ to $10^6$ particles per square millimeter.

In the above-mentioned optical diffusing film, preferably, the transparent substrate is one selected from the group consisting of PET, PC and PS, and the diffusing particle is one selected from the group consisting of silicone resin, PS and PMMA.

In the above-mentioned optical diffusing film, preferably, an antiblocking coating with a refractive index of 1.4 to 1.7 is disposed on a lower surface of the transparent substrate, wherein antiblocking particles with a refractive index of 1.4 to 1.7 and a diameter of 2 to 10 μm are provided in the antiblocking coating; and the antiblocking particles are dispersed on the surface without contacting with each other; the antiblocking coating has a thickness of ½ to ⅔ of the largest particle size of the antiblocking particles; and a coating density of the antiblocking particles is 70 to 500 particles per square millimeter.

Furthermore, the present invention also provides a liquid crystal display backlight comprising a light source for emitting light, a reflector, a light guide plate and a frame, an optical diffusing film and a prism sheet, wherein the optical diffusing film includes a transparent substrate made of an optically transparent material with a refractive index of 1.4 to 1.8, and a diffusing coating with a refractive index of 1.4 to 1.7 disposed on an upper surface of the transparent substrate, wherein diffusing particles with a refractive index of 1.4 to 1.7 are disposed in the coating; characterized in that, the diffusing particles are in close contact with each other and distributed in the coating, and the diffusing particles consist of following spherical particles with respective diameters in respective mass percentages: spherical particles with a diameter of 1 to 10 μm in 10 to 30% by mass, spherical particles with a diameter of 11 to 20 μm in 50 to 80% by mass, and spherical particles with a diameter of 21 to 35 μm in 0 to 20% by mass; the diffusing particles are arranged randomly; the diffusing coating has a thickness of ½ to ⅔ of the largest particle size of the diffusing particles; and a coating density of the diffusing particles is $10^3$ to $10^6$ particles per square millimeter.

In the above-mentioned liquid crystal display backlight, preferably, the transparent substrate is one selected from the group consisting of PET, PC and PS, and the diffusing particle is one selected from the group consisting of silicone resin, PS and PMMA.

In the above-mentioned liquid crystal display backlight, preferably, an antiblocking coating with a refractive index of 1.4 to 1.7 is disposed on a lower surface of the transparent substrate, wherein antiblocking particles with a refractive index of 1.4 to 1.7 and a diameter of 2 to 10 μm are provided in the antiblocking coating; the antiblocking particles are dispersed in the antiblocking coating without contacting with each other, and protrude from the antiblocking coating; the antiblocking coating has a thickness of ½ to ⅔ of the largest particle size of the antiblocking particles; and a coating density of the antiblocking particles is 70 to 500 particles per square millimeter.

In the above-mentioned liquid crystal display backlight, preferably, the light source is at least one selected from the group consisting of a cold cathode fluorescent lamp, an external electrode fluorescent lamp, a light emitting diode, a hot cathode fluorescent lamp, and an organic light emitting diode, and the light source can be provided at a side of the light guide plate or between the light guide plate and the reflector.

Compared with the optical diffusing film in the prior art, the optical diffusing film according to the present invention has advantages of having higher haze and light-converging ability, by controlling the particle size, arrangement, and amount per unit area of the spherical diffusing particles in the diffusing coating thereof and thickness of the diffusing coating.

An optical diffusing film in a specific embodiment according to the present invention further comprises an antiblocking coating with antiblocking particles, so that when the optical diffusing film is used in a backlight module for a display, a thin air layer can be formed between the optical diffusing film and other elements in the module, thereby preventing the optical diffusing film from adhering with other elements.

Similarly, the liquid crystal display backlight obtained by using the above-mentioned optical diffusing film according to the present invention has advantages of having less assembled elements, and higher haze and luminance.

Figure 1:
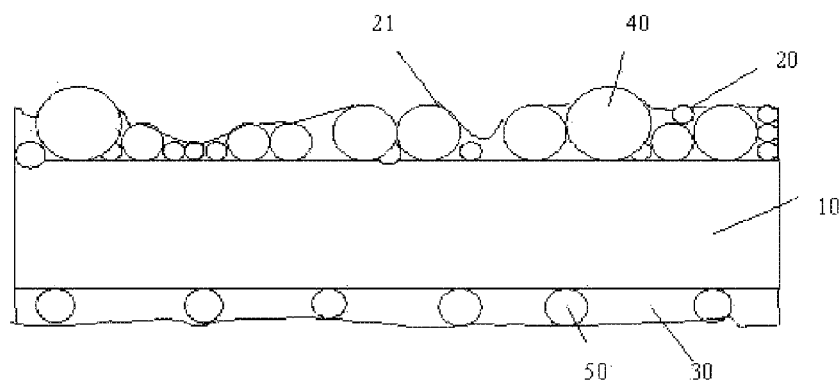
FIG. 1 is a schematic sectional view of an optical diffusing film in the prior art.

The Reference signs and abbreviations as used in the Drawings and Description and meanings thereof are listed below:

10: transparent substrate;
20: diffusing coating;
30: antiblocking coating;
40: scattering particles;
50: antiblocking particles;
100: optical diffusing film;
110: transparent PET substrate;
120: diffusing coating;
130: antiblocking coating;
140: diffusing particles;
150: antiblocking particles;
500: optical diffusing film;
510: transparent PET substrate;
520: diffusing coating;
530: antiblocking coating;
540: spherical PMMA diffusing particles;
550: spherical PMMA antiblocking particles;
710: light tube;
720: reflector;
730: transparent light guide plate;
740: optical diffusing film;
750: liquid crystal display panel;
760: light guide plate in the desktop computer monitor;
770: light guide plate in the desktop computer monitor;
PET: polyethylene terephthalate;
PC: polycarbonate;
PS: polystyrene;
PMMA: poly(methyl methacrylate).

DESCRIPTION OF SPECIFIC EMBODIMENTS

The present invention will be described herein in detail with reference to the accompanying Drawings and the following Examples.

Example 1

Figure 2:
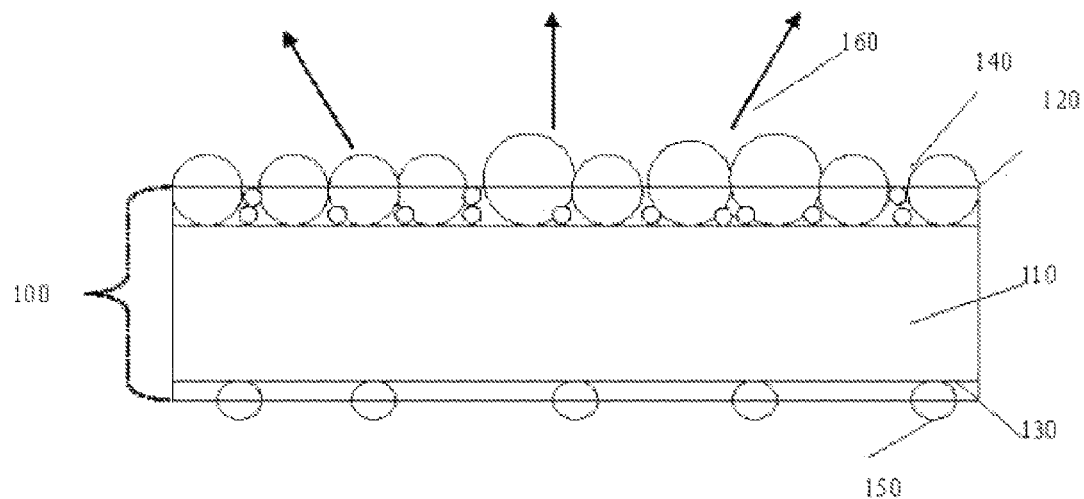
FIG. 2 is a schematic sectional view of an optical diffusing film in Examples 1 and 2 of the present invention.

As shown in FIG. 2, an optical diffusing film 100 comprises a transparent PET substrate 110, a diffusing coating 120 containing spherical PMMA diffusing particles 140, and an antiblocking coating 130 containing spherical PMMA antiblocking particles 150. The diffusing particles in different particle sizes in the diffusing coating 120 are being combined in the ratio as shown in Table 1, in which those large diffusing particles 140 are arranged firmly together in the diffusing coating 120, and those small diffusing particles 140 are dispersed and filled within the diffusing coating 120, and light can be diffused due to the differences of refractive indexes among the small diffusing particles 140, substrate 110 and diffusing coating. The thickness of the diffusing coating 120 is strictly controlled to half of the particle size of those large diffusing particles 140, that is, half part of those large diffusing particles 140 are embedded in the diffusing coating 120, and the other half are exposed on the diffusing coating 120, thereby forming a lens configuration having a light-converging effect, so as to converge the light 160 transmitted from below. The spherical PMMA antiblocking particles 150 with a particle size of 5 μm are arranged sparsely and randomly in the antiblocking coating 130, and the coating density thereof is 100 particles per square millimeter. The thickness of the antiblocking coating 130 is half particle size of the antiblocking particles 150, and a thin air layer can be formed between the antiblocking coating and other members of module because of the part of the antiblocking particles 150 protruded from the antiblocking coating 130, so as to prevent adhesion between this optical diffusing film 100 and other members.

TABLE 1

| Particle size of diffusing particles (μm) | Mass percentage of particles (%) | Coating density (particles/m$^2$) | Haze (%) | Luminance (Cd/m$^2$) |
| --- | --- | --- | --- | --- |
| 1 | 30 | 10$^6$ | 98 | 1558 |
| 11 | 70 | | | |

Example 2

As shown in FIG. 2, an optical diffusing film 100 comprises a transparent PET substrate 110, a diffusing coating 120 containing spherical PS diffusing particles 140, and an antiblocking coating 130 containing spherical PMMA antiblocking particles 150. The diffusing particles in different particle sizes in the diffusing coating 120 are being combined in the ratio as shown in Table 2, in which those large diffusing particles 140 are arranged firmly together in diffusing coating 120, and those small diffusing particles 140 are dispersed and filled within the diffusing coating 120, and light can be diffused due to the differences of refractive indexes among the small diffusing particles, substrate 110 and resin coating. The thickness of the diffusing coating 120 is strictly controlled to $3/5$ of the particle size of those largest diffusing particles 140, that is, along the thickness direction, the embedded portion of those largest diffusing particles 140 in the diffusing coating 120 are $3/5$ of the particle size thereof, and the exposed portion of those largest diffusing particles 140 on the diffusing coating 120 are $2/5$ of the particle size thereof, thereby forming a lens configuration having a light-converging effect, so as to converge the light 160 transmitted from below. The spherical PMMA antiblocking particles 150 with a particle size of 8 μm are arranged sparsely and randomly in the antiblocking coating 130, and the coating density thereof is 70 particles per square millimeter. The thickness of the antiblocking coating 130 is $2/3$ of the particle size of the antiblocking particles 150, and a thin air layer can be formed between the antiblocking coating and other members of module because of the part of the antiblocking particles 150 protruded from the antiblocking coating 130, so as to prevent adhesion between this optical diffusing film 100 and other members.

TABLE 2

| Particle size of diffusing particles (μm) | Mass percentage of particles (%) | Coating density (particles/m$^2$) | Haze (%) | Luminance (Cd/m$^2$) |
|---|---|---|---|---|
| 5 | 10 | 10$^4$ | 90 | 1800 |
| 20 | 80 | | | |
| 35 | 10 | | | |

Example 3

An optical diffusing film comprises a transparent PET substrate, a diffusing coating containing spherical PMMA diffusing particles, and an antiblocking coating containing spherical PMMA antiblocking particles. The diffusing particles in different particle sizes in the diffusing coating are being combined in the ratio as shown in Table 3, and they are arranged firmly together in the diffusing coating. The thickness of the diffusing coating is strictly controlled to $2/3$ of the particle size of the largest diffusing particles. The antiblocking coating comprises antiblocking particles with a particle size of 2 μm, and the antiblocking particles are arranged sparsely and randomly in the antiblocking coating, and the coating density thereof is 500 particles per square millimeter. The thickness of the antiblocking coating is $3/5$ of the particle size of antiblocking particles, and a thin air layer can be formed between the antiblocking coating and other members of module because of the part of the antiblocking particles protruded from the antiblocking coating, so as to prevent adhesion between this optical diffusing film and other members.

TABLE 3

| Particle size of diffusing particles (μm) | Mass percentage of particles (%) | Coating density (particles/m$^2$) | Haze (%) | Luminance (Cd/m$^2$) |
|---|---|---|---|---|
| 3 | 15 | 10$^5$ | 97 | 1750 |
| 15 | 65 | | | |
| 35 | 20 | | | |

Example 4

An optical diffusing film comprises a transparent PET substrate, a diffusing coating containing spherical diffusing particles of silicone resin, and an antiblocking coating containing spherical PMMA antiblocking particles. The diffusing particles in different particle sizes in the diffusing coating are being combined in the ratio as shown in Table 4, and they are arranged firmly together in the diffusing coating. The thickness of the diffusing coating is strictly controlled to $4/7$ of the particle size of the largest diffusing particles. The antiblocking coating comprises antiblocking particles with a particle size of 10 μm, and the antiblocking particles are arranged sparsely and randomly in the antiblocking coating, and the coating density thereof is 150 particles per square millimeter. The thickness of the antiblocking coating is $1/2$ of the particle size of the antiblocking particles, and a thin air layer can be formed between the antiblocking coating and other members of module because of the part of the antiblocking particles protruded from the antiblocking coating, so as to prevent adhesion between this optical diffusing film and other members.

TABLE 4

| Particle size of diffusing particles (μm) | Mass percentage of particles (%) | Coating density (particles/m$^2$) | Haze (%) | Luminance (Cd/m$^2$) |
|---|---|---|---|---|
| 2 | 6 | 10$^4$ | 96 | 1710 |
| 5 | 4 | | | |
| 8 | 2 | | | |
| 15 | 12 | | | |
| 16 | 16 | | | |
| 18 | 15 | | | |
| 20 | 20 | | | |
| 22 | 8 | | | |
| 28 | 4 | | | |
| 30 | 3 | | | |

Example 5

An optical diffusing film comprises a transparent PET substrate, a diffusing coating containing spherical PS diffusing particles, and an antiblocking coating containing spherical PMMA antiblocking particles. The diffusing particles in different particle sizes in the diffusing coating are being combined in the ratio as shown in Table 5, and they are arranged firmly together in the diffusing coating. The thickness of the diffusing coating is strictly controlled to $5/8$ of the particle size of the largest diffusing particles. The antiblocking coating comprises antiblocking particles with a particle size of 4 μm, and the antiblocking particles are arranged sparsely and randomly in the antiblocking coating, and the coating density thereof is 400 particles per square millimeter. The thickness of the antiblocking coating is $3/5$ of the particle size of antiblocking particles, and a thin air layer can be formed between the antiblocking coating and other members of module because of the part of the antiblocking particles protruded from the antiblocking coating, so as to prevent adhesion between this optical diffusing film and other members.

TABLE 5

| Particle size of diffusing particles (μm) | Mass percentage of particles (%) | Coating density (particles/m²) | Haze (%) | Luminance (Cd/m²) |
|---|---|---|---|---|
| 2 | 4 | 10⁵ | 97 | 1680 |
| 4 | 8 | | | |
| 6 | 8 | | | |
| 8 | 5 | | | |
| 12 | 17 | | | |
| 16 | 15 | | | |
| 20 | 25 | | | |
| 25 | 10 | | | |
| 30 | 8 | | | |

Example 6

An optical diffusing film comprises a transparent PET substrate, a diffusing coating containing spherical PMMA diffusing particles, and an antiblocking coating containing spherical PMMA antiblocking particles. The diffusing particles in different particle sizes in the diffusing coating are being combined in the ratio as shown in Table 6, and they are arranged firmly together in the diffusing coating. The thickness of the diffusing coating is strictly controlled to ½ of the particle size of the largest diffusing particles. The antiblocking coating comprises antiblocking particles with a particle size of 3 μm, and the antiblocking particles are arranged sparsely and randomly in the antiblocking coating, and the coating density thereof is 450 particles per square millimeter. The thickness of the antiblocking coating is ⅝ of the particle size of the antiblocking particles, and a thin air layer can be formed between the antiblocking coating and other members of module because of the part of the antiblocking particles protruded from the antiblocking coating, so as to prevent adhesion between this optical diffusing film and other members.

TABLE 6

| Particle size of diffusing particles (μm) | Mass percentage of particles (%) | Coating density (particles/m²) | Haze (%) | Luminance (Cd/m²) |
|---|---|---|---|---|
| 2 | 8 | 10⁵ | 95 | 1650 |
| 4 | 2 | | | |
| 6 | 2 | | | |
| 8 | 6 | | | |
| 10 | 12 | | | |
| 12 | 14 | | | |
| 14 | 20 | | | |
| 16 | 14 | | | |
| 18 | 16 | | | |
| 20 | 6 | | | |

Example 7

Figure 3:
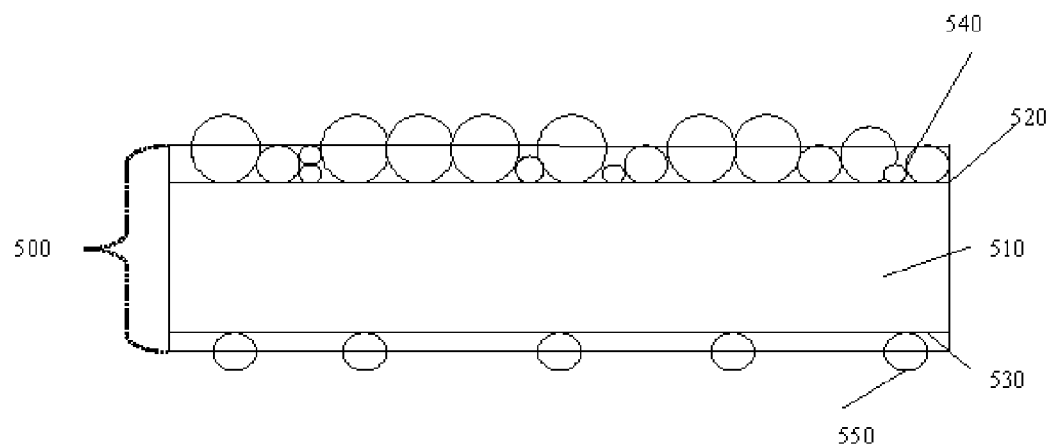
FIG. 3 is a schematic sectional view of an optical diffusing film in Example 7 of the present invention.

As shown in FIG. 3, similar as the optical diffusing film in Example 1, an optical diffusing film 500 comprises a transparent PET substrate 510, a diffusing coating 520 containing spherical PMMA diffusing particles 540, and an antiblocking coating 530 containing spherical PMMA antiblocking particles 550. The diffusing particles 540 in different particle sizes in the diffusing coating are being combined in the ratio as shown in Table 7.

TABLE 7

| Particle size of diffusing particles (μm) | Mass percentage of particles (%) | Coating density (particles/m²) | Haze (%) | Luminance (Cd/m²) |
|---|---|---|---|---|
| 1 | 30 | 10³ | 52 | 1650 |
| 19 | 50 | | | |
| 30 | 20 | | | |

Example 8

Figure 4:
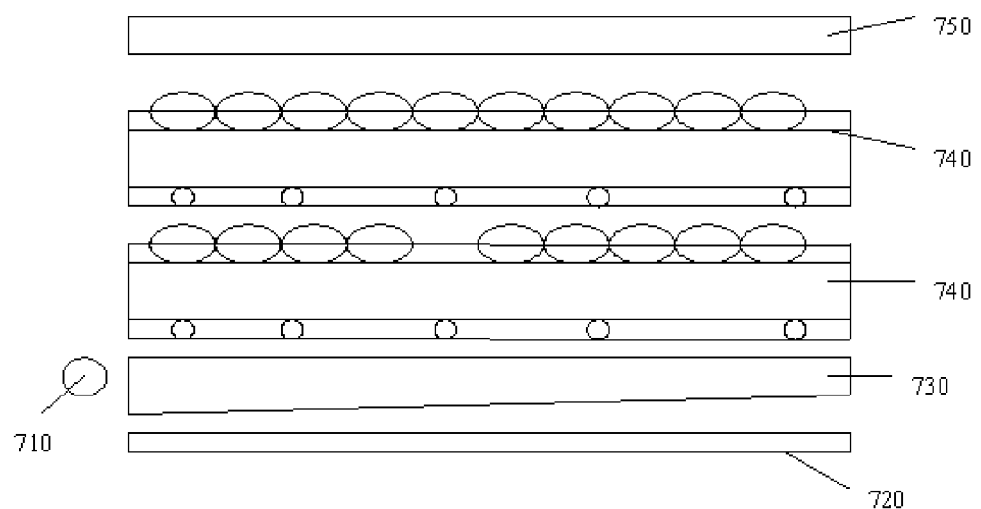
FIG. 4 is a schematic sectional view of a backlight for notebook computer display in Example 8 of the present invention.

This example provides a side-emitting backlight for notebook computer display, in which two of the above-mentioned optical diffusing films according to the present invention are used. FIG. 4 shows an example in which the side-emitting backlight containing two of the optical diffusing films is applied to a notebook computer display. In FIG. 4, 710 represents a light tube, 720 represents a reflector with high-efficiency, 730 represents a transparent light guide plate in the backlight, 740 represents an optical diffusing film and 750 represents a liquid crystal display panel.

Example 9

Figure 5:
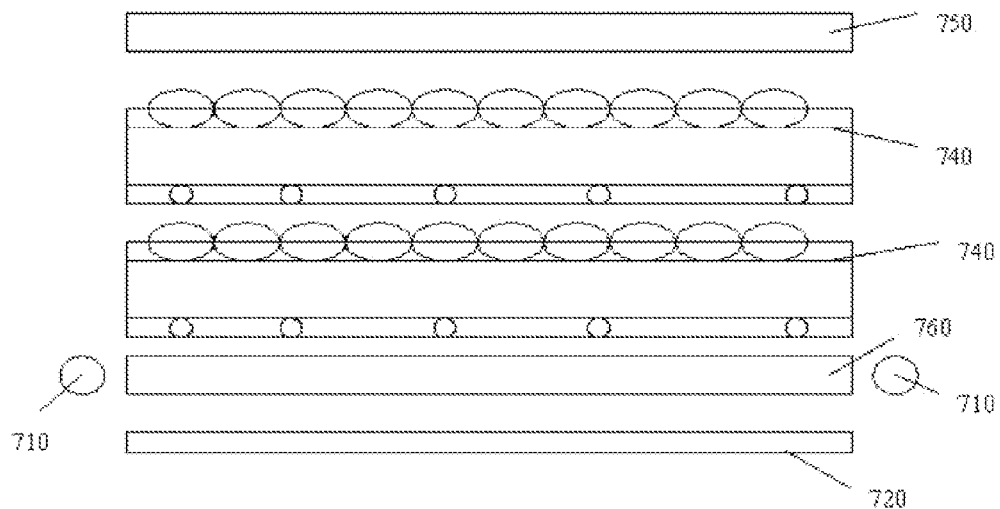
FIG. 5 is a schematic sectional view of a backlight for desktop computer display in Example 9 of the present invention.

This example provides a backlight for desktop computer monitor, in which two of the above-mentioned optical diffusing films according to the present invention are used. FIG. 5 shows an example in which a backlight containing two of the optical diffusing films is applied to a desktop computer monitor. In FIG. 5, 710 represents a light tube, 720 represents a reflector with high-efficiency, 760 represents a light guide plate in the desktop computer monitor, 740 represents an optical diffusing film and 750 represents liquid crystal display panel.

Example 10

Figure 6:
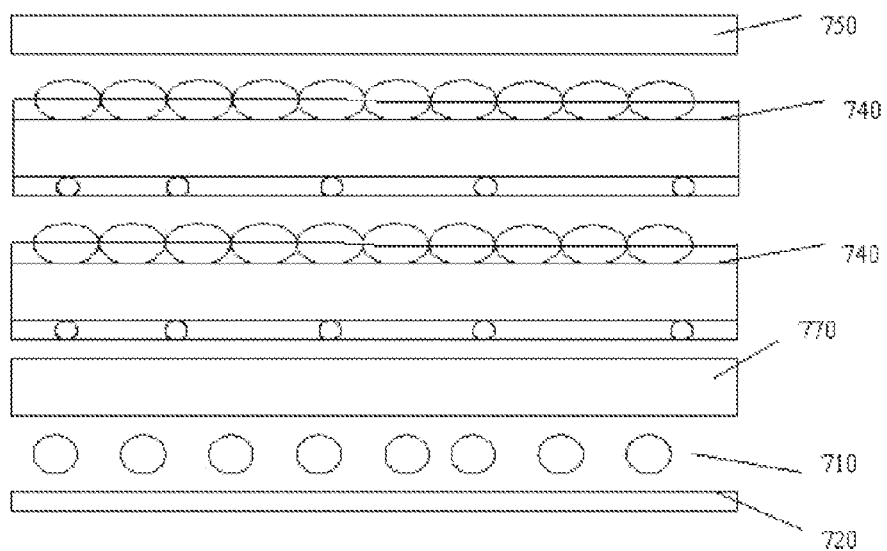
FIG. 6 is a schematic sectional view of a backlight for LCD in Example 10 of the present invention.

This example provides a backlight for LCD, in which two of the above-mentioned optical diffusing films according to the present invention are used. FIG. 6 shows an example in which a backlight containing two of the optical diffusing films is applied to a LCD. In FIG. 6, 710 represents a light tube, 720 represents a reflector with high-efficiency, 770 represents a light guide plate in the desktop computer monitor, 740 represents an optical diffusing film and 750 represents a liquid crystal display panel.

In the above Examples, the light tubes 710 may be at least one selected from the group consisting of a cold cathode fluorescent lamp, an external electrode fluorescent lamp, a light emitting diode and a hot cathode fluorescent lamp.

It should be understood that the embodiments and examples described above are merely illustrative ones provided for the purpose of explaining the mechanism of the present invention, but the invention is not intended to be limited thereto. Various modifications and alterations of this invention will become apparent to those skilled in the art without departing from the spirit and scope of this invention, and therefore, are also within the scope of the invention.

The invention claimed is:
1. An optical diffusing film comprising
   a transparent substrate made of an optically transparent material with a refractive index of 1.4 to 1.8, and
   a diffusing coating with a refractive index of 1.4 to 1.7 disposed on an upper surface of the transparent substrate, wherein diffusing particles with a refractive index of 1.4 to 1.7 are distributed in the diffusing coating;
wherein the diffusing particles are in close contact with each other, and the diffusing particles consist of following spherical particles with respective diameters in respective mass percentages:
spherical particles with a diameter of 1 to 10 μm in 10 to 30% by mass,
spherical particles with a diameter of 11 to 20 μm in 50 to 80% by mass, and
spherical particles with a diameter of 21 to 35 μm in 0 to 20% by mass;
the diffusing particles are arranged randomly;
the diffusing coating has a thickness of ½ to ⅔ of the largest particle size of the diffusing particles; and
a coating density of the diffusing particles is $10^3$ to $10^6$ particles per square millimeter.

2. The optical diffusing film according to claim 1, wherein the transparent substrate is one selected from the group consisting of PET, PC and PS, and the diffusing particle is one selected from the group consisting of silicone resin, PS and PMMA.

3. The optical diffusing film according to claim 1, wherein an antiblocking coating with a refractive index of 1.4 to 1.7 is disposed on a lower 2surface of the transparent substrate,
antiblocking particles with a refractive index of 1.4 to 1.7 and a diameter of 2 to 10 μm are provided in the antiblocking coating;
the antiblocking particles are dispersed in the antiblocking coating without contacting with each other, and protrude from the antiblocking coating;
the antiblocking coating has a thickness of ½ to ⅔ of the largest particle size of the antiblocking particles; and
a coating density of the antiblocking particles is 70 to 500 particles per square millimeter.

4. A liquid crystal display backlight comprising
a light source for emitting light,
a reflector,
a light guide plate,
a frame,
an optical diffusing film, and
a prism sheet,
wherein the optical diffusing film includes
a transparent substrate made of an optically transparent material with a refractive index of 1.4 to 1.8, and
a diffusing coating with a refractive index of 1.4 to 1.7 disposed on an upper surface of the transparent substrate, wherein diffusing particles with a refractive index of 1.4 to 1.7 are distributed in the diffusing coating;
wherein the diffusing particles are in close contact with each other, and the diffusing particles consist of following spherical particles with respective diameters in respective mass percentages:
spherical particles with a diameter of 1 to 10 μm in 10 to 30% by mass,
spherical particles with a diameter of 11 to 20 μm in 50 to 80% by mass, and
spherical particles with a diameter of 21 to 35 μm in 0 to 20% by mass;
the diffusing particles are arranged randomly;
the diffusing coating has a thickness of ½ to ⅔ of the largest particle size of the diffusing particles; and
a coating density of the diffusing particles is $10^3$ to $10^6$ particles per square millimeter.

5. The liquid crystal display backlight according to claim 4, wherein the transparent substrate is one selected from the group consisting of PET, PC and PS, and the diffusing particle is one selected from the group consisting of silicone resin, PS and PMMA.

6. The liquid crystal display backlight according to claim 4, wherein
an antiblocking coating with a refractive index of 1.4 to 1.7 is disposed on a lower surface of the transparent substrate,
antiblocking particles with a refractive index of 1.4 to 1.7 and a diameter of 2 to 10 μm are provided in the antiblocking coating;
the antiblocking particles are dispersed in the antiblocking coating without contacting with each other, and protrude from the antiblocking coating;
the antiblocking coating has a thickness of ½ to ⅔ of the largest particle size of the antiblocking particles; and
a coating density of the antiblocking particles is 70 to 500 particles per square millimeter.

7. The liquid crystal display backlight according to claim 4, wherein the light source is at least one selected from the group consisting of a cold cathode fluorescent lamp, an external electrode fluorescent lamp, a light emitting diode, a hot cathode fluorescent lamp, and an organic light emitting diode, and the light source is provided at a side of the light guide plate or between the light guide plate and the reflector.

8. The optical diffusing film according to claim 2, wherein
an antiblocking coating with a refractive index of 1.4 to 1.7 is disposed on a lower surface of the transparent substrate,
antiblocking particles with a refractive index of 1.4 to 1.7 and a diameter of 2 to 10 μm are provided in the antiblocking coating;
the antiblocking particles are dispersed in the antiblocking coating without contacting with each other, and protrude from the antiblocking coating;
the antiblocking coating has a thickness of ½ to ⅔ of the largest particle size of the antiblocking particles; and
a coating density of the antiblocking particles is 70 to 500 particles per square millimeter.

9. The liquid crystal display backlight according to claim 5, wherein
an antiblocking coating with a refractive index of 1.4 to 1.7 is disposed on a lower surface of the transparent substrate,
antiblocking particles with a refractive index of 1.4 to 1.7 and a diameter of 2 to 10 μm are provided in the antiblocking coating;
the antiblocking particles are dispersed in the antiblocking coating without contacting with each other, and protrude from the antiblocking coating;
the antiblocking coating has a thickness of ½ to ⅔ of the largest particle size of the antiblocking particles; and
a coating density of the antiblocking particles is 70 to 500 particles per square millimeter.

* * * * *